Patented Oct. 11, 1932

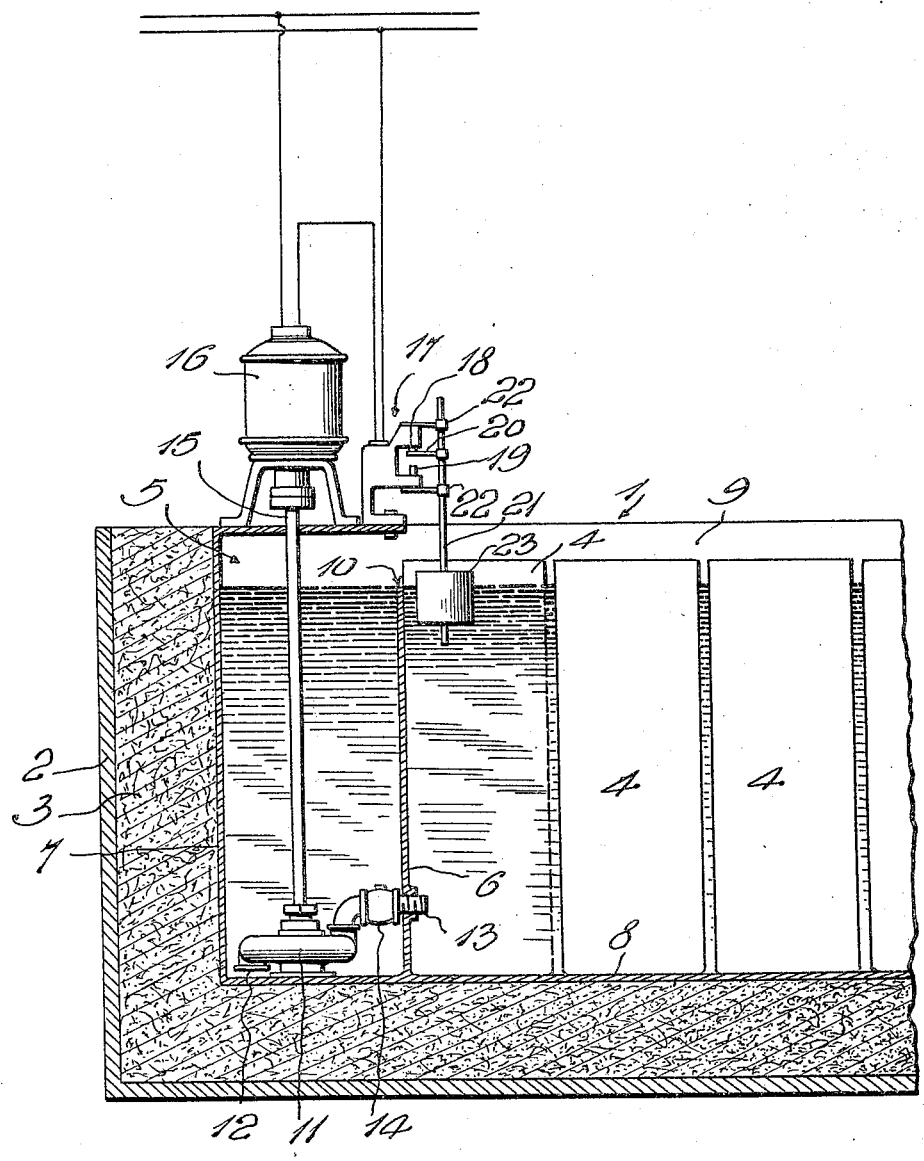

1,882,189

UNITED STATES PATENT OFFICE

GEORGE W. MILLER, OF WASHINGTON, DISTRICT OF COLUMBIA

ICE PLANT

Application filed August 19, 1931. Serial No. 558,112.

Like my companion application Serial No. 558,111, filed August 19, 1931, the present invention relates to ice plants of the type whose freezing means embodies a brine tank for containing the usual cans in which blocks of ice are frozen, and whereas said companion case discloses a structure in which compressed air is used, for forcing a level-restoring quantity of brine from an auxiliary tank into the main tank when cans are removed from the latter, the present invention aims to provide a unique structure in which a power-driven pump is used for forcing the brine from said auxiliary tank to said main tank.

A further aim is the provision of means controlled by the level of brine in the main tank, for controlling the above-mentioned pump.

Yet another aim is to provide a structure which permits the main tank to overflow into the auxiliary tank without requiring any manual operations, when the brine reaches the proper level in said main tank, upon insertion of the ice cans.

With the foregoing in view, the invention resides in the novel subject matter hereinafter described and claimed, description being accomplished by reference to the accompanying drawing, in which the figure is a partial vertical longitudinal sectional view showing a brine tank embodying my improvements.

In the drawing above briefly described, the numeral 1 denotes a brine tank surrounded by the conventional shell 2 containing heat-insulation 3, said tank 1 constituting part of the conventional provision for freezing the ice. Within the tank 1, a number of the ice cans 4 have been illustrated, and while I have shown an auxiliary brine tank 5 within one end of said tank 1, an equivalent auxiliary tank could of course be constructed separate from said tank 1. In forming the auxiliary tank 5 as shown in the drawing, I provide a vertical transverse partition 6 near one end 7 of the tank 1, said partition being fluid-tightly secured at its lower edge to the tank bottom 8 and similarly secured at its ends to two of the opposed side walls 9 of said tank 1. The upper edge 10 of the partition 6 is spaced below the upper edge of the tank 1 and hence overflowing of brine from tank 1 into tank 5 overcomes the possibility of an abnormally high brine level in said tank 1.

Within the lower end of the auxiliary brine tank 5, I have shown a liquid pump 11 whose inlet 12 communicates with said auxiliary tank, while the outlet 13 from the pump discharges into the main tank 1 and is provided with a check valve 14 if the outlet communicates with the main tank at a point below the normal liquid level in said tank. A shaft 15 is provided for driving the pump 11, the upper end of said shaft being connected with an electric motor 16 having a controlling switch 17 of any desired shape and operated in any desired manner but which preferably embodies two push buttons 18 and 19, the former for opening the circuit of the motor 12 and the latter for closing said circuit. An operating arm 20 is disposed between the buttons 18 and 19 and is carried by a vertical rod 21 which is slidable in appropriate guides 22, the lower end of said rod being provided with a float 23 in the main brine tank 1.

Upon removal of a number of the cans 4 from the tank 1, the brine lowers in this tank and if such lowering be sufficient to impair the freezing of the water in the other cans, it is sufficient also to allow the float 23 to descend until the arm 20 pushes upon the button 19, thereby closing the circuit of the motor 16. This motor then drives the pump 14 to force brine from the auxiliary tank 5 into the main tank 1, to restore the brine in this tank to the proper level, and by the time such level has been reached, the ascending float 23 causes the arm 20 to push upon the button 18, thereby breaking the circuit of the motor 16 and stopping the pump 11. The check valve 14 then prevents back-flow of brine from the tank 1 into the auxiliary tank 5. When additional cans are now inserted into the tank 1, the brine of course rises in the latter, but it then simply overflows into the auxiliary tank 5 so that there is no danger of any of the brine entering the cans 4.

While the general construction disclosed, may be considered as preferred, variations may of course be made within the scope of the invention as claimed.

I claim:—

1. In an ice plant, the combination with a main brine tank and ice cans removable therefrom; of an auxiliary brine tank, means whereby the brine may be caused to flow from the auxiliary tank into the main tank when cans are removed from the latter, and from said main tank to said auxiliary tank when cans are inserted into said main tank, said means embodying brine-forcing means, a float controlled by the liquid level in said main tank, and means actuated by said float for controlling said brine-forcing means.

2. In an ice plant, the combination with a main brine tank and ice cans removable therefrom; of an auxiliary brine tank into which brine may gravitate from said main tank to prevent an abnormally high brine level in said main tank, means for forcing a level-restoring quantity of brine from said auxiliary tank into said main tank when cans are removed from the latter, a float controlled by the liquid level in said main tank, and means controlled by said float for effecting operation of said brine-forcing means upon lowering of brine in said main tank and for discontinuing operation of said forcing means when the brine level has been restored in said main tank.

3. An improvement in a conventional ice plant having all necessary elements for freezing cans of water, said necessary elements including a main ice can receiving brine tank whose entire brine level is changed by insertion and removal of any of the cans; said improvement comprising an auxiliary brine tank into which brine may overflow from said main tank when any of the cans are inserted into said main tank, said auxiliary tank being extraneous to all of said necessary elements, and means also extraneous to all of said necessary elements for pumping brine from said auxiliary tank into said main tank to restore the entire brine level in the latter when all of the cans are removed.

4. An improvement in a conventional ice plant having all necessary elements for freezing cans of water, said necessary elements including a main ice can receiving brine tank whose entire brine level is changed by insertion and removal of any of the cans; said improvement comprising a partition near one vertical wall of said tank, said partition extending entirely between two other vertical walls of said tank and being fluid-tightly secured to the latter and to the tank bottom, providing an auxiliary brine tank into which the main tank may overflow when any of the cans are inserted into said main tank, said auxiliary tank being extraneous to said necessary elements; a pump also extraneous to said necessary elements, said pump having an inlet open to said auxiliary tank and an outlet discharging into said main tank, and driving means for said pump, said inlet and outlet and driving means being extraneous to said necessary elements, whereby said pump may be operated independently of the freezing operations of the plant to pump brine from the auxiliary tank into the main tank to restore the entire brine level in the latter upon removal of any of the cans.

5. An improvement in a conventional ice plant having all necessary elements for freezing cans of water, said necessary elements including a main ice can receiving brine tank whose entire brine level is changed by insertion and removal of any of the cans; said improvement comprising an auxiliary brine tank extraneous to said necessary elements; means also extraneous to said necessary elements whereby the brine may be caused to flow from the auxiliary tank into the main tank to restore the entire brine level in the latter when any can is removed, and means extraneous to said necessary elements for permitting brine in the main tank to overflow into the auxiliary tank when the brine reaches the normal level in said main tank.

In testimony whereof I affix my signature.

GEORGE W. MILLER.